United States Patent Office 2,808,438
Patented Oct. 1, 1957

2,808,438

TRIS-[DI(LOWER)ALKYLAMINOALKYL]-AMINES

Renat H. Mizzoni, Chester, N. J., and Caesar R. Scholz, Basel, Switzerland, assignors to Ciba Pharmaceutical Products, Inc., Summit, N. J.

No Drawing. Application April 27, 1953,
Serial No. 351,506

12 Claims. (Cl. 260—583)

This invention relates to tris-(dialkylaminoalkyl)-amines, their acid salts, and to the preparation of said amines and salts.

More particularly, the invention relates to tris-[di-(lower)-alkylaminoalkyl]-amines wherein the alkyl groups to which the di(lower)-alkylamino groups are joined, contain two to four carbon atoms, with the proviso that at most only one such alkyl group contains four carbon atoms.

The novel compounds, in the form of the free base, can be represented by the following formula:

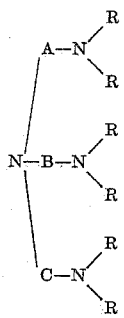

wherein A, B and C are alkylene radicals containing two to four carbon atoms and may be the same or different, with the proviso that at most only one of A, B and C contains four carbon atoms; and the R's are lower alkyl groups which may be the same or different.

Compounds comprising our invention exhibit the ability to inhibit or prevent the transmission of nerve impulses via the ganglia of the autonomic nervous system, and are accordingly useful as ganglionic blocking agents. The ganglionic blocking action leads to the lowering of the blood pressure in cases of hypertension, to relief of tachycardia induced by certain drugs, and to the decrease of acid secretion and the consequent relief of symptoms in cases of peptic ulcer. Compounds of the above formula wherein at most only one of the groups A, B and C contains four carbon atoms and the lower alkyl groups contain one to two carbon atoms, in general, exhibit the greatest ganglionic blocking activity.

Among the new compounds found to be particularly active are tris-(2-diethylaminoethyl)-amine, bis-(2-diethylaminoethyl)-3-diethylaminopropylamine, bis - (2 - diethylaminoethyl)-3-dimethylaminopropylamine, bis-(2-diethylaminoethyl) - 4 - diethylaminobutylamine and tris-(2-dimethylaminoethyl)-amine.

The novel compounds can be prepared by various methods. According to one illustrative procedure, they can be obtained by reacting, as for example, by heating, a di(lower)alkylaminoalkyl halide with a di(lower)alkylaminoalkyl amine, according to the following reaction scheme:

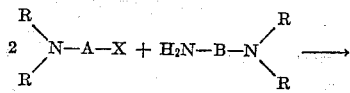

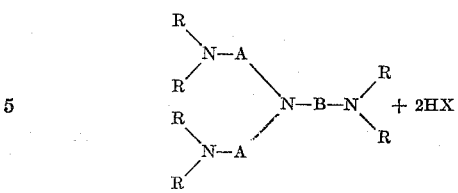

wherein A, B and R have the same meanings already assigned thereto and X stands for a halogen atom, for example, Cl, Br or I.

Solvents are not essential for the reaction but, if desired, use may be made of a suitable alcohol or hydrocarbon solvent medium such, for example, as ethyl alcohol, butyl alcohol, amyl alcohol, benzene, toluene, xylene and the like.

The crude reaction product is purified advantageously by crystallization or the free base may be recovered therefrom by making the reaction mixture alkaline and extracting the base, which may be further purified by distillation. The free bases can be converted into salt form with an appropriate acid, such as hydrochloric acid, sulfuric acid, acetic acid, tartaric acid, citric acid, maleic acid, malic acid, benzoic acid, p-amino-benzoic acid, etc., whereby the corresponding hydrochloride, sulfate, acetate, tartrate, citrate, maleate, malate, benzoate, p-amino-benboate, etc. is produced.

According to an alternative procedure, the novel compounds are prepared by reacting in an inert solvent such as benzene a tris-(halogenalkyl)-amine with the desired secondary di(lower)alkylamine according to the following reaction scheme:

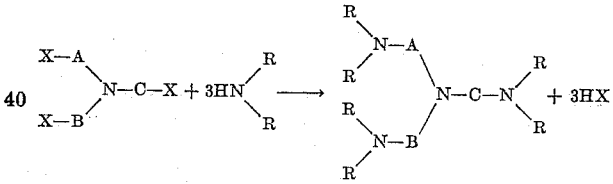

wherein each of A, B, C, and R's and X have the previously indicated significance. The crude reaction product may be worked up as described in connection with the first mode of procedure.

Alternatively, new compounds according to the present invention may be prepared by reacting, for example, at room temperature or by heating a di(lower)alkylaminoalkyl halide with aqueous or alcoholic ammonia. The reaction scheme is as follows:

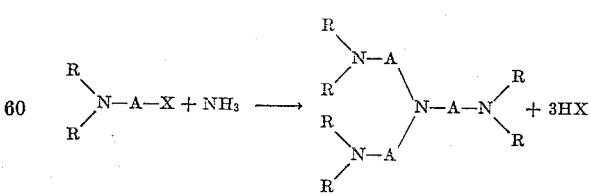

wherein A, R and X have the previously indicated significances.

Still another method of preparing compounds according to the present invention involves alkylation of a nitrilo alkyl-amine, for example, by reacting it with an aldehyde and reducing the resulting product to the mono-(lower) alkylamine, followed by alkylation with a lower alkyl halide in the presence of lithium amide. These reactions proceed according to the following scheme:

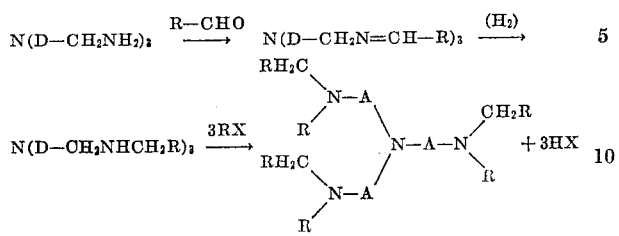

wherein A, D, R and X have the previously indicated significances.

In preparing the tris-(dimethylaminoalkyl)-amine, alkylation of the primary amine with formaldehyde and formic acid proceeds directly to the desired tertiary amine derivative, thus:

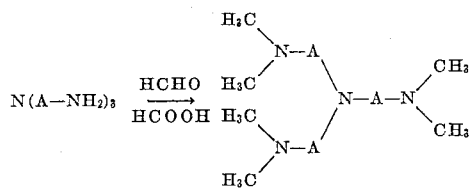

wherein A has the significance given previously.

The examples which follow illustrate the invention in greater detail, but it is to be understood that they are presented by way of illustration only and not by way of limitation. Temperatures are given in degrees centigrade.

*Example 1*

290 parts by weight of N,N-diethyl-ethylene-diamine are mixed with 711 parts by weight of 2-diethylaminoethyl chloride, and the resultant homogeneous solution is heated, while stirring thoroughly, until a vigorous exothermic reaction sets in. Heating is thereupon discontinued and the reaction mixture allowed to cool to about 50°. Approximately 1000 parts by volume of water are added slowly with stirring. The formed oily and aqueous layers are separated, the aqueous portion basified with strong caustic soda solution until the formation of supernatant oily layer is complete, whereupon the latter is removed with the aid of ethylene dichloride. The combined oily portion and ethylene dichloride extracts are dried with anhydrous sodium carbonate. The dried solution is filtered, the solvent removed, and the oily residue distilled in vacuo (boiling point 105–110° at 0.15 mm. pressure). It is the free base, tris-(2-diethylaminoethyl)-amine, which corresponds to the formula

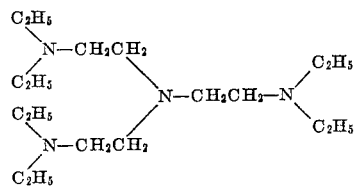

The distillate thus obtained is dissolved in 100 parts by volume of anhydrous ethanol, and the solution treated with 512 parts by volume of 9-normal ethanolic hydrogen chloride at 10–20° C. The resulting solution is diluted with 1250 parts by volume of methyl ethyl ketone and refrigerated. The material which crystallizes is filtered off, washed with methyl ethyl ketone, and recrystallized from propanol. The product, which melts at 222.5°–224.5°, is tris-(2-diethylaminoethyl)-amine trihydrochloride:

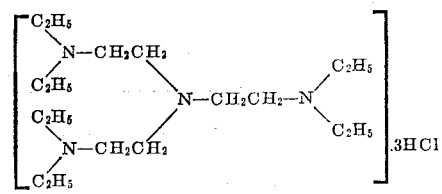

By passing anhydrous hydrogen chloride through an ether solution of tris-(2-diethylaminoethyl)-amine the tetra hydrochloride salt of the latter precipitates. It is filtered off and dried in vacuo over $P_2O_5$; M. P. 193.5–195°. The compound is extremely hygroscopic.

*Example 2*

3.15 parts by weight of tris-(2-diethylaminoethyl)-amine are dissolved in 10 parts by volume of ethanol, and to this solution is added a solution of 5.76 parts by weight of anhydrous citric acid in 15 parts by volume of ethanol. The solution is filtered and the solvent is removed from the filtrate on a water bath. Complete removal of ethanol is effected in vacuo in a desiccator containing calcium chloride. Crystallization gradually occurs during removal of the solvent. The obtained product, which is the tricitrate of tris-(2-diethylaminoethyl)-amine melts at 127–130°.

*Example 3*

19.2 parts by weight of 2-di-n-butylaminoethyl chloride are mixed with 5.8 parts by weight of N,N-diethyl-ethylene-diamine, and the temperature of the well-stirred mixture is raised slowly until a vigorous exothermic reaction sets in. Heating is continued for ¼ hour and the mixture allowed to cool. The cooled mixture is taken up in about 100 parts by volume of water, with stirring. The resultant homogeneous solution is basified with strong caustic soda solution until an oily supernatant layer forms. The mixture is extracted with ethylene dichloride to separate the oily layer, and the extract is dried over anhydrous potassium carbonate. The resultant solution is filtered and the solvent removed under reduced pressure. The oily residue is then distilled in vacuo, that fraction being collected which boils between 110 and 160° at 0.2 mm. pressure. It is substantially the free base which corresponds to the formula

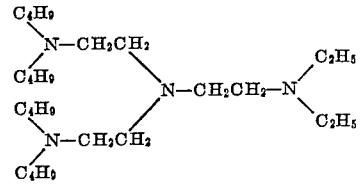

8.5 parts by weight of the base thus obtained are taken up in 10 parts by volume of absolute ethanol and treated with three equivalents of 10-N alcoholic hydrogen chloride per mol of base. The salt obtained upon refrigeration of the resultant solution is recrystallized from a mixture of isopropanol and ether. Bis-(2-di-n-butylaminoethyl)-2-diethylaminoethyl-amine trihydrochloride is obtained as a hygroscopic salt which melts at 127.5–129.5°. It corresponds to the formula

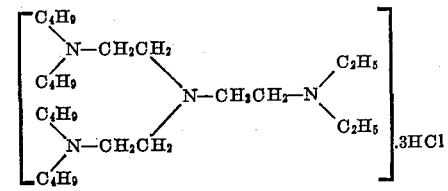

Example 4

6 parts by weight of tris-(2-aminoethyl)-amine hydrochloride are added to a solution composed of 7 parts by weight of sodium bicarbonate and 20.3 parts by weight of 90% formic acid. There are then added 11.6 parts by volume of formaldehyde (37% solution) and the mixture heated carefully for a few minutes until the immediate vigorous reaction subsides, followed by heating for 16 hours on a steam bath. The clear yellow solution is cooled and acidified with about 10 parts by volume of concentrated hydrochloric acid. After evaporation to dryness on a steam bath, the solvent is dissolved in a minimum amount of water and then is made strongly alkaline by adding solid potassium hydroxide. The solution is extracted exhaustively with ether. The combined extracts are dried over anhydrous magnesium sulfate which is then filtered off, and the clear yellow ether extracts treated with gaseous hydrogen chloride until no more soild forms. The solid is filtered off, washed freely with ether and recrystallized from 95% ethanol. Recrystallization is hastened by the addition of about ¼ to ½ volume of methyl ethyl ketone. The tris-(2-dimethylaminoethyl)-amine tetrahydrochloride thus obtained is washed with methyl ethyl ketone and dried at 50° in vacuo; it melts at 278–278.5° (with decomposition).

Example 5

140 parts by weight of 2-diethylaminoethyl chloride is added over ¼ hour with efficient stirring, to a refluxing solution of 51 parts by weight of 3-dimethylaminopropylamine in 200 parts by volume of n-butanol. Refluxing is continued for 20 minutes. The solvent is removed by distillation in vacuo and the oily residue taken up in water. Basic materials are liberated by addition of concentrated sodium hydroxide in excess. The product is taken up in ether and the extract dried over anhydrous potassium carbonate. After removal of the solvent in vacuo the residue is distilled, boiling point 100–140°/0.3 mm. The base bis-(2-diethylaminoethyl)-3-dimethylaminopropylamine, thus obtained, is dissolved in alcohol and treated with 3 equivalents of 10 N alcoholic hydrogen chloride per equivalent of base. The addition of acetone facilitates rapid crystallization. The salt thus obtained is recrystallized from isopropanol to yield bis-(2-diethylaminoethyl)-3-dimethylaminopropylamine trihydrochloride, melting point 201° C., and having the formula:

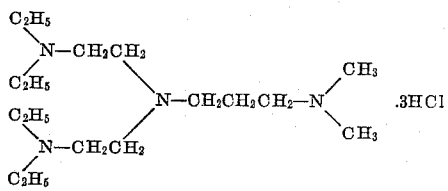

Example 6

70 parts by weight of 3-diethylaminopropyl chloride is added with efficient stirring to a refluxing solution of 26.7 parts by weight of 2-diethylaminoethylamine in 100 parts by volume of n-butanol. Refluxing is continued for 1 hour. After cooling a white crystalline solid separates out which is filtered and washed freely with methyl ethyl ketone. Recrystallization from 95% ethanol yields bis-(3-diethylaminopropyl)-2-diethylaminoethylamine trihydrochloride; melting point 244–247° C. having the formula:

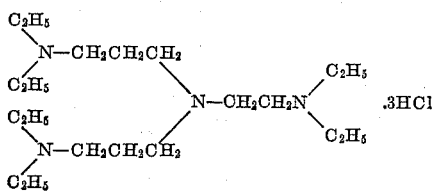

Example 7

40 parts by weight of 2-diethylaminoethyl chloride is added with efficient stirring to a refluxing solution of 14 parts by weight of 3-diethylaminopropylamine in 80 parts by volume of n-butanol, at such a rate that moderate refluxing occurs. Refluxing is continued for an additional 15 minutes. About half the solvent is removed by distillation and the residue diluted with methyl ethyl ketone. The solid which separates is recrystallized from ethanol-methyl ethyl ketone to yield bis-(2-diethylaminoethyl)-3-diethylaminopropylamine trihydrochloride monohydrate; melting point 230° and having the formula:

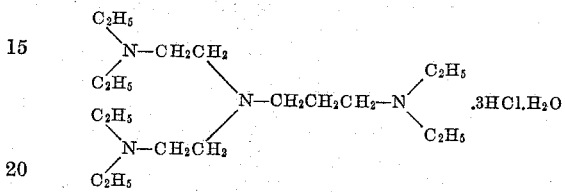

More rigorous drying results in the formation of the half-hydrate of the above salt having a melting point of 227–229° C.

Example 8

40 parts by weight of 3-diethylaminopropyl chloride is added over a 20 minute period with efficient stirring to a refluxing solution of 17 parts by weight of 3-diethylaminopropylamine in 50 parts by volume of n-butanol. Refluxing is continued for an additional 15 minutes during which time a white crystalline solid separates out. After cooling, the solid material is filtered off, washed freely with methyl ethyl ketone and dried in vacuo at 60° C. On recrystallization from ethanol and drying tris-(3-diethylaminopropyl)-amine trihydrochloride is obtained having a melting point of 275° corresponding to the formula:

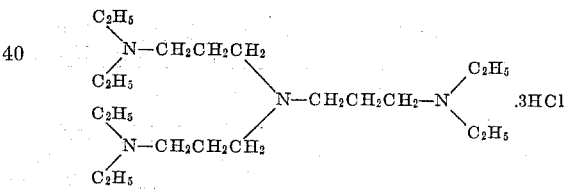

Example 9

Over a 25 minute period 68 parts by weight of 2-diethylamino-ethyl chloride are added with efficient stirring to a refluxing solution of 46.6 parts by weight of 3-dibutylaminopropylamine in 75 parts by volume of butanol. Refluxing is continued for an additional 10 minutes after which the solvent is removed by distillation in vacuo and the oily residue taken up in water. The aqueous solution is basified with concentrated sodium hydroxide, the oily layer separated and dried over solid potassium hydroxide. The bis-(2-diethylaminoethyl)-3-dibutylaminopropylamine, thus obtained, boiling at 157–160° at 0.1 mm., is converted to the hydrochloride salt by treating an alcoholic solution of the base with more than three equivalents of alcoholic hydrogen chloride. The excess alcohol and hydrogen chloride are removed by co-distillation with methyl ethyl ketone and the hygroscopic material which crystallizes out is recrystallized twice from isopropyl alcohol to yield the tetrahydrochloride of bis-(2-diethylaminoethyl)-3-dibutylaminopropylamine: melting point 197–199° and having the following formula:

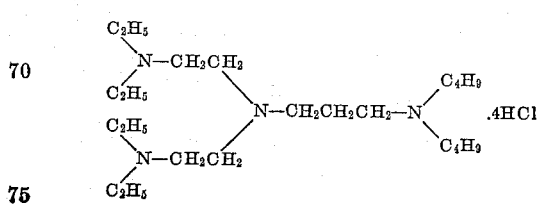

Example 10

42.7 parts by weight of 3-dipropylaminopropyl chloride is added dropwise over 1 hour with efficient stirring to a refluxing solution of bis-(2-diethylaminoethyl)-amine in 100 parts by volume of butanol. The mixture is refluxed for 1 hour, the solvent is removed in vacuo and the oily residue taken up in water. The resulting aqueous solution is made strongly alkaline with concentrated sodium hydroxide solution and extracted with ether. The ether extract is dried using successive portions of fresh sodium hydroxide pellets. After removal of the ether the base remaining is distilled, the fraction having a boiling point of 135–158° at 0.07 mm. is dissolved in absolute ethanol and treated with 3 equivalents of 10 N alcoholic hydrogen chloride. Methyl ethyl ketone is added and the mixture distilled to remove the ethanol-methyl ethyl ketone azeotrope. Repetition of this process effectively removes the ethanol and results in crystallization of the product. Upon recrystallization from isopropanol-methyl ethyl ketone bis-(2-diethylaminoethyl)-3-di-propylaminopropylamine trihydrochloride dihydrate is obtained; melting point 178.5–180°.

Example 11

During 20 minutes 71 parts by weight of 2-diethylaminoethyl chloride is added with stirring to a refluxing solution of 32.5 parts by weight of 4-diethylaminobutylamine in 100 parts by volume of butanol. The mixture is refluxed for an additional 5 minutes and after cooling somewhat is diluted with 2 volumes of methyl ethyl ketone. After standing in refrigeration for some time, the solid which separates is filtered off, washed with methyl ethyl ketone and recrystallized from ethanol-methyl ethyl ketone to yield the trihydrochloride of bis-(2-diethylaminoethyl)-4-diethylaminobutylamine; melting point 225–226.5°.

This application is a continuation in part of our application, Serial No. 221,328, filed on April 16, 1951 now abandoned.

What is claimed is:

1. A member of the class consisting of tris-[di(lower)-alkyl-aminoalkyl]-amines wherein each of the alkyl groups to which the di(lower)-alkylamino groups are attached contains two to four carbon atoms, with the proviso that at most only one such alkyl group contains four carbon atoms, and their acid salts.

2. The hydrochloric acid salt of tris-(2-diethylaminoethyl)-amine.

3. Tris-(2-diethylaminoethyl)-amine.

4. Bis-(2 - diethylaminoethyl) - 3 - diethylaminopropylamine.

5. Bis-(2-diethylaminoethyl)-3 - dimethylaminopropylamine.

6. Bis - (2 - diethylaminoethyl) - 4 - diethylaminobutylamine.

7. The process for preparing tris-(2-diethylaminoethyl)-amine which comprises reacting about one mol of N,N-diethyl-ethylene-diamine with about two mols of 2-diethylaminoethyl chloride with heat.

8. The process for perparing bis-(2-diethylaminoethyl)-3-diethylaminopropylamine which comprises reacting about two mols of 2-diethylaminoethyl chloride with about one mol of 3-diethylaminopropylamine with heat.

9. The process for preparing bis-(2-diethylaminoethyl)-3-dimethylaminopropylamine which comprises reacting about two mols of 2-diethylaminoethyl chloride with about one mol of 3-dimethylaminopropylamine with heat.

10. The process of preparing bis-(2-diethylaminoethyl)-4-diethylaminobutylamine which comprises reacting about two mols of 2-diethylaminoethyl chloride with about one mol of 4-diethylaminobutylamine with heat.

11. The process of preparing tris-(2-dimethylaminoethyl)-amine which comprises reacting tris-(2-aminoethyl)-amine with formaldehyde and formic acid with heat.

12. A process for preparing tris-[di(lower)alkylaminoalkyl]-amines which comprises reacting about two mols of a di(lower)alkylaminoalkyl halide with about one mol of a di(lower)alkylaminoalkyl amine with heat.

References Cited in the file of this patent

UNITED STATES PATENTS

| | | |
|---|---|---|
| 2,318,730 | Wilson | May 11, 1943 |
| 2,654,785 | Miescher et al. | Oct. 6, 1953 |
| 2,668,854 | Miescher et al. | Feb. 9, 1954 |

OTHER REFERENCES

Yonkman et al.: "Arch. intern. pharmacodynamine" (January 1952), vol. 88, pp. 401–6.